US007017593B2

(12) United States Patent
Honda

(10) Patent No.: US 7,017,593 B2
(45) Date of Patent: Mar. 28, 2006

(54) PIPE WASHING METHOD AND PIPE WASHING APPARATUS

(76) Inventor: Toshimi Honda, 317 Otamachi, Igazaki-shi, Gunma 372-0006 (JP)

( * ) Notice: Subject to any disclaimer, the term of this patent is extended or adjusted under 35 U.S.C. 154(b) by 90 days.

(21) Appl. No.: 10/250,464

(22) PCT Filed: Oct. 2, 2001

(86) PCT No.: PCT/JP02/08682

§ 371 (c)(1),
(2), (4) Date: Jul. 2, 2003

(87) PCT Pub. No.: WO03/020633

PCT Pub. Date: Mar. 13, 2003

(65) Prior Publication Data

US 2004/0040585 A1 Mar. 4, 2004

(51) Int. Cl.
*B08B 9/02* (2006.01)
*E21B 37/00* (2006.01)

(52) U.S. Cl. ................................ 134/22.11; 134/22.12; 134/102.2; 134/167 C; 134/168 C; 166/312

(58) Field of Classification Search ................ 134/22.1, 134/22.11, 22.12, 22.18, 102.2, 167 C, 168 C, 134/98.1; 166/311, 312
See application file for complete search history.

(56) References Cited

U.S. PATENT DOCUMENTS 5,146,988 A * 9/1992 Paul .......................... 166/312
5,803,101 A * 9/1998 Gallo ..................... 134/166 C
6,027,572 A * 2/2000 Labib et al. ................... 134/8
6,029,746 A * 2/2000 Dodd ......................... 166/312
6,142,232 A * 11/2000 Troutt et al. ................ 166/312
6,170,577 B1 * 1/2001 Noles et al. ................ 166/312
6,195,585 B1 * 2/2001 Karunasiri et al. ........... 607/57

FOREIGN PATENT DOCUMENTS

JP 3-2932 A 1/1991
JP 2558590 B2 11/1996

* cited by examiner

*Primary Examiner*—Michael Barr
*Assistant Examiner*—Saeed Chaudhry
(74) *Attorney, Agent, or Firm*—Birch, Stewart, Kolasch & Birch, LLP

(57) ABSTRACT

A micro device in which a functional element can be moved between an operating position and a waiting position by the displacement of support means coupled to a substrate. The micro device has a cantilever structure in which one end of support means is made a fixed one fixed to the substrate and the other end to which an active element is provided is made a free end. A spring portion is provided to at least part of the support means, and thus the active element can be greatly displaced by a small stress.

11 Claims, 7 Drawing Sheets

PIPE WASHING METHOD AND PIPE WASHING APPARATUS

This application is the national phase under 35 U.S.C. § 371 of PCT International Application No. PCT/JP02/08682 which has an International filing date of Oct. 2, 2001, which designated the United States of America.

TECHNICAL FIELD

The present invention relates to a pipe washing method and a pipe washing apparatus, and more particularly, to a pipe washing method and a pipe washing apparatus capable of effectively washing the interiors of pipes (water supply pipes and the like) of buildings, factories, and the like as well as capable of investigating water leakage in the pipes. Further, the present invention relates also to a well pipe washing method and a well pipe washing apparatus capable of effectively washing the interiors of well pipes for pumping up underground water in a short time.

BACKGROUND ART

Usual buildings and complex housing have pipes (water supply pipes and the like) installed therein for supplying drinking water and water for other applications. Used as these pipes are a cast ion pipe, galvanized steel pipe, lead pipe, copper pipe, asbestos-cement pipe, rigid polyvinyl chloride pipe, and the like. These pipes become unsanitary because water stain, scale, rust, and the like are deposited on the inner wall surfaces thereof while they are used for a long period. Thus, there are conventionally employed a method of washing the interiors of the pipes by supplying a washing fluid from a water spraying cock of a building and the like or a method of removing water stain and the like deposited in the pipes by the water pressure of high pressure water compressed by a compressor and driven into the pipes. Further, there is conventionally employed a method of removing the water stain and the like by inserting a wire with a brush attached to an extreme end and by scrubbing the inner wall surfaces of the pipes with a brush portion.

However, when the interior of the pipe is washed using the washing fluid, a problem is arisen in that not only water stain, scale, rust, and the like are not perfectly removed but also drinking water cannot be used several days because washing fluid remains in the water. Further, the high pressure washing executed using high pressure water has a drawback in that perfect removal of water stain and the like deposited in the pipe is difficult and further in that many operation processes are necessary until the pipe is washed because a large-scale facility such as a compressor, water tank, and the like are required.

Further, the method of scrubbing the inner wall surface of the pipe by the wire with the brush has a problem in practical use because it is difficult to wash a bent portion of the pipe and further a wire as long as the pipe is necessary.

Meanwhile, wells are dug in homes, factories, agricultural regions, and the like to obtain drinking water and agricultural water. Ordinarily, a well pipe such as a clay pipe, Hume pipe and the like is laid in the well to prevent soil avalanche in a dug hole. A usual well pipe is composed of a cylindrical casing portion and a screen portion having a plurality of small holes, and underground water penetrating through the screen portion and stored in the interior of the well pipe is pumped up by a pump when necessary.

Similarly to the pipes in the housing and the buildings described above, water stain, scale, rust, and the like are also deposited on the inner wall of the well pipe when it is used for a long period. Thus, the interior of the well pipe must be washed periodically from a sanitary point of view. Exemplified as a usual washing method is a method of removing water stain and the like deposited on the inner walls of the casing portion 103 and the screen portion 104 by moving up and down a wire brush 140 having a diameter larger than the inner diameter of a well pipe 102 as shown in FIG. 9. When high pressure air is supplied into the well pipe 102 by a compressor 141, the water stain, sludge, and the like in the well pipe 102 removed by the above operation are discharged to the outside as the air rises as shown in FIG. 10.

However, since the conventional well pipe washing method is divided into an operation for removing water stain from an inner wall and an operation for discharging the water stain from a well, a long operation time and a lot of manpower are necessary and a washing cost is expensive.

Further, when a well pipe is washed with the brush, the water stain, rust, and the like deposited on an inner wall cannot be effectively removed because the extreme end of the brush is curved or bent during washing. Further, in the method of removing water stain and sludge by rising air, it is impossible to discharge water stain having a large size and sludge having a large weight to the outside of a well pipe.

Accordingly, an object of the present invention is to overcome the above problems and to provide a pipe washing method and a pipe washing apparatus capable of washing the inner wall surface of a pipe reliably and very sanitarily in a short time without the need of a large-scale facility and operation process as well as capable of investigating water leakage in the pipe when pipes in housing and buildings are washed. Further, an object of the present invention is to provide a well pipe washing method and a well pipe washing apparatus capable of washing the inner wall surface of a well pipe easily and effectively in a short time with a reduced operation time and process when well pipes are washed.

DISCLOSURE OF THE INVENTION

To solve the above problems, a pipe washing method of the present invention is characterized by comprising the step of intermittently or continuously driving carbon dioxide gas into a pipe to wash the interior thereof by the foaming action of the carbon dioxide gas dissolved in the water in the pipe. Here, the dissolved carbon dioxide gas can be easily vaporized by flowing water in the pipe, and the interior of the pipe can be washed by reliably removing water stain, scale, rust, and the like deposited on the inner wall of the pipe by the action of the vaporized carbon dioxide gas. Further, at this time, when a crack arises in a part of the pipe, the driven carbon dioxide gas spouts out from the crack portion. Thus, the cracked portion of the pipe can be easily found by spouting noise, thereby water leakage can be investigated simultaneously with the washing of the pipe. Further, since carbon dioxide gas, which is used also in drinking water, is used, the pipe washing method exhibits excellent characteristics in the aspect of hygiene.

A pipe washing apparatus of the present invention is characterized by comprising gas cylinders filled with carbon dioxide gas, a dispersing device for intermittently or continuously spouting the carbon dioxide gas supplied from the gas cylinders, and a connection hose for causing the dispersing device to communicate with a pipe to be washed. With this arrangement, a large-scale facility such as a compressor, a large water tank, and the like are not necessary, thereby an equipment investment cost and an operation process can be reduced.

In the pipe washing apparatus of the present invention, it is preferable that a pressure valve for discharging gas and water in the pipe when the pressure in the pipe reaches at least a predetermined level be interposed between the dispersing device and the connection hose. With this arrangement, the breakage of the pipe caused by the pressure of the charged carbon dioxide gas can be prevented before it arises.

Further, in the pipe washing apparatus of the present invention, it is preferable that a foaming agent charger for charging powder foaming agent be connected between the dispersing device and the connection hose. When the foaming agent is charged into the pipe by the foaming agent charger through the connection pipe, the water stain, scale, rust, and the like deposited on the inner wall surface of the pipe can be more effectively removed by the synergy effect of the foaming power of the carbon dioxide gas supplied from the gas cylinders and the foaming action of the powder foaming agent. Further, even if an amount of the carbon dioxide gas in the gas cylinders lacks, the interior of the pipe can be washed by the foaming agent having been foamed.

Further, in the pipe washing apparatus of the present invention, it is preferable that a supply device for charging an additive be connected to the dispersing device. In this case, when the additive is any one kind selected from a group including water, in particular, hot water, nitrogen, ionic water, chlorine, ozone water, antirust, and oxygen, and, in particular, when the additive is silver-ionic water, the washing force of the carbon dioxide gas for the interior of the pipe is improved by accelerating the foaming of the carbon dioxide gas as well as the sanitizing and sterilizing effect of the pipe can be also obtained, thereby the reoccurrence of rust and the like can be prevented before they occur.

The pipe washing apparatus of the present invention can be preferably used by being loaded on a vehicle, thereby the apparatus can be promptly and easily moved to a washing site of water supply pipes and the like.

Further, to solve the above problems, a well pipe washing method of the present invention is characterized by comprising the step of intermittently or continuously driving compressed air into a well pipe and, simultaneously therewith, spouting high pressure water to wash the interior of the well pipe. Accordingly, the inner wall of the well pipe is washed by the air impulse wave of the driven compressed air as well as the compressed air driven continuously forms large foam portions while it expands and rises in the well pipe. When the high pressure water is spouted to the large foam portions, the water stain and the like deposited on the inner wall of the pipe can be directly exfoliated and washed by the high pressure water.

Further, in the well pipe washing method of the present invention, carbon dioxide gas may be used in place of the compressed air to preferably wash the interior of the well pipe by the action of the carbon dioxide gas dissolved in the water in the well pipe and by the high pressure water. In this case, since the driven carbon dioxide gas is dissolved in the well water and then vaporized and foamed while rising in the well pipe similarly to the pipe described above, water stain, scale, rust and the like deposited on the inner wall of the well pipe are strongly exfoliated and removed by the foaming action of the carbon dioxide gas.

Further, in the well pipe washing method of the present invention, since the high pressure water is spouted to the inner wall surface of the well pipe from an obliquely downward direction, the water stain and the like can be strongly and effectively supplied upward as foams rise.

A well pipe washing apparatus of the present invention is characterized by comprising a dispersing device for intermittently or continuously spouting compressed air or carbon dioxide gas, a hose for flowing the compressed air or the carbon dioxide gas spouted from the dispersing device into a well pipe to be washed and a high pressure water washing device for spouting the high pressure water into the well pipe to be washed. With this arrangement, the water stain deposited on the interior of the well pipe is washed and the exfoliated water stain and sludge can be discharged by an operation executed once, thereby workability can be improved and a cost can be reduced.

In the well pipe washing apparatus of the present invention, it is preferable that the high pressure water washing device comprise a high pressure water manufacturing unit for manufacturing the high pressure water, a high pressure hose for flowing the high pressure water spouted from the high pressure water manufacturing unit into the well pipe to be washed, and a washing nozzle attached to the extreme end of the high pressure hose and capable of adjusting a direction in which the high pressure water is spouted. Further, carbon dioxide gas can be driven into the well pipe by connecting a carbon dioxide gas supply device for supplying carbon dioxide gas to the dispersing device.

Further, in the well pipe washing apparatus of the present invention, compressed air or carbon dioxide gas and high pressure water can be spouted at predetermined positions by providing a nozzle holder for holding the position of the wash nozzle at an approximate center in the well pipe, thereby the interior of the well pipe can be uniformly washed.

BEST MODE FOR CARRYING OUT THE INVENTION

Specific embodiments of the present invention will be described below in detail.

Figure 1:
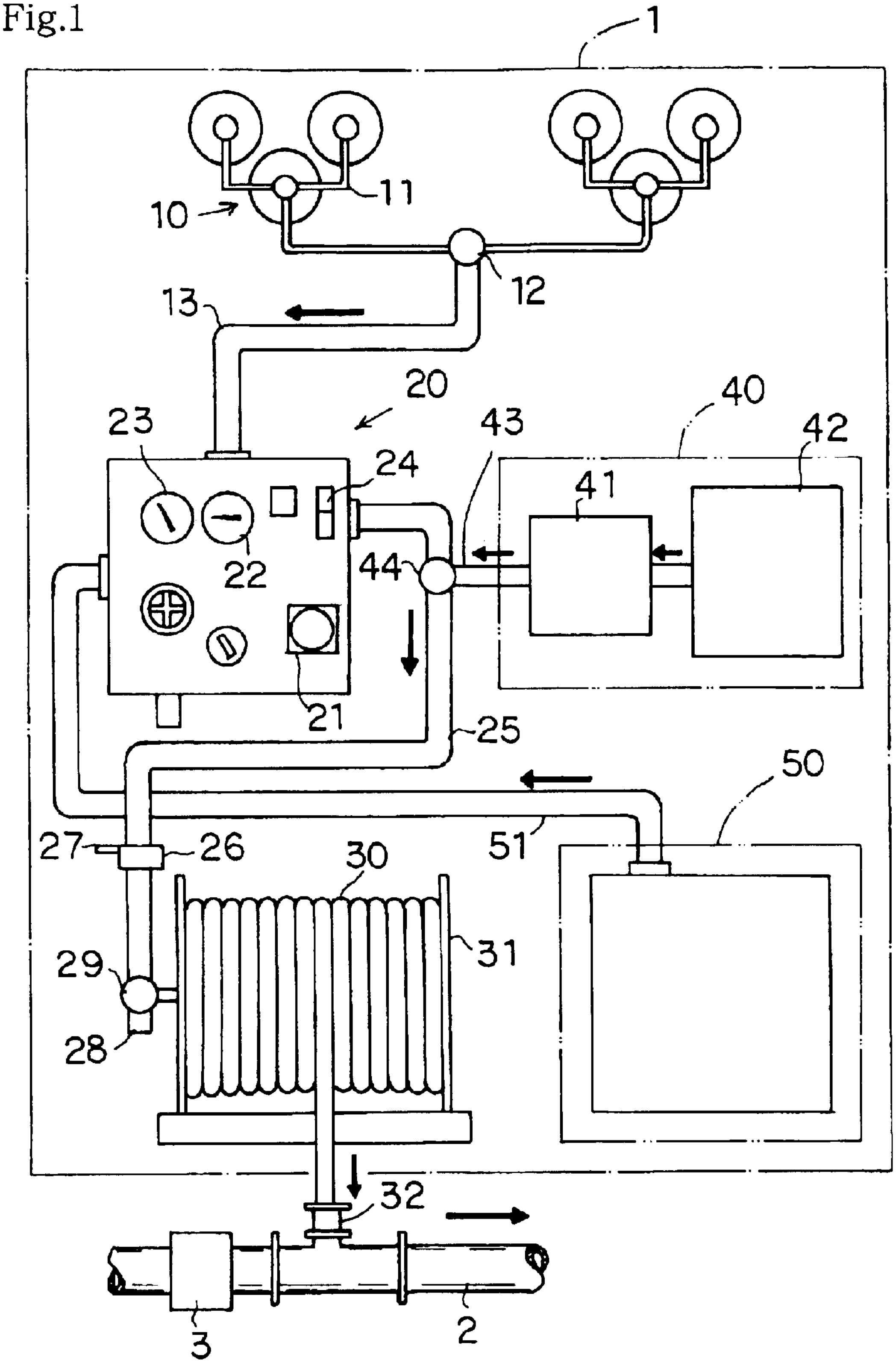
FIG. 1 is an overall schematic view showing an example of a pipe washing apparatus of the present invention.

First, embodiments of a pipe washing method and a pipe washing apparatus of the present invention will be described. FIG. 1 is an overall schematic view showing an example of the pipe washing apparatus of the present invention.

The illustrated pipe washing apparatus 1 includes gas cylinders 10 filled with compressed carbon dioxide gas a, a dispersing device 20 capable of continuously or intermittently spouting the carbon dioxide gas a supplied from the gas cylinders 10, and a connection hose 30 for causing the dispersing device 20 to communicate with a pipe 2 to be washed.

A plurality of the gas cylinders 10 are coupled with each other through gas pipes 11 and connected to a gas hose 13 through an open/close valve 12. Further, an opposite end of the gas hose 13 is coupled with the dispersing device 20, and the carbon dioxide gas a in the gas cylinders 10 is supplied into the dispersing device 20 through the gas hose 13.

The dispersing device 20 spouts the carbon dioxide gas a supplied from the gas cylinders 10 into the pipe 2 intermittently at appropriate intervals or continuously and includes a timer 21 for adjusting a spouting time and an intermittent time of the carbon dioxide gas a, an airflow meter 22 for adjusting an amount of the gas to be spouted, an air pressure gauge 23 for adjusting a gas pressure of the carbon dioxide gas a, and further a switch 24 for activating and deactivating these meter and gauge.

Further, the dispersing device 20 is connected to the connection hose 30 through a coupling pipe 25, and the carbon dioxide gas a spouted from the dispersing device 20 can be supplied into the pipe 2 through the connection hose 30 by appropriately manipulating a grip 27 of an open/close valve 26 attached to the coupling pipe 25. The connection hose 30 can be wound around, for example, a hose reel 31 as shown in the figure, and an opposite end of the connection hose 30 is coupled with the pipe 2 through a coupler 32.

As shown in the figure, it is preferable to interpose a pressure valve 29 between the dispersing device 20 and the connection hose 30 to discharge carbon dioxide gas a and water in the pipe 2 to the outside from a discharge port 28 when the pressure in the pipe 2 reaches at least a predetermined level due to the carbon dioxide gas a supplied thereinto. Provision of the pressure valve 29 can prevent the pipe 2 from being broken by the pressure of the carbon dioxide gas a before it is broken.

Further, it is preferable that the pipe washing apparatus 1 include a foaming agent charge device 40 for charging a powder foaming agent. The foaming agent charge device 40 can be connected between the dispersing device 20 and the connection hose 30, that is, to the coupling pipe 25 in the illustrated example. The foaming agent charge device 40 is mainly composed of an accommodation vessel 41 for accommodating the powder foaming agent and an air compressor 42 for supplying the foaming agent in the accommodation vessel 41 into the coupling pipe 25 through a charge pipe 43. Further, a pressure valve 44 is disposed at a coupling portion where the charge pipe 43 is coupled with the coupling pipe 25 to intermittently supply the foaming agent supplied from the foaming agent charge device 40 into the coupling pipe 25.

When the foaming agent is charged between the dispersing device 20 and the connection hose 30 by the foaming agent charge device 40, a synergy effect is obtained between the foaming power of the carbon dioxide gas a supplied from the gas cylinders 10 and the foaming action of the powder foaming agent, thereby water stain, scale, rust, and the like deposited on the inner wall surface of the pipe 2 can be more effectively removed. Further, even if the carbon dioxide gas a in the gas cylinders 10 lacks, the interior of the pipe 2 can be washed by the foaming agent having been foamed.

Further, it is preferable that the pipe washing apparatus 1 include a supply device 50 for charging an additive such as a liquid, gas, powder, and the like into the dispersing device 20. The supply device 50 communicates with the dispersing device 20 through a supply pipe 51 and supplies the additive accommodated in the supply device 50 into the dispersing device 20 by a charge unit (not shown) and the like. The additive supplied from the supply device 50 is mixed with the carbon dioxide gas a in the dispersing device 20 and spouted into the pipe 2.

Exemplified as the additive are, for example, water, in particular, hot water, nitrogen, ionic water, in particular, silver-ionic water, chlorine, ozone water, antirust, oxygen, etc. Supplying an appropriate amount of water into the dispersing device 20 as the additive can increase an amount water supplied into the pipe 2 and can keep the foaming power of the carbon dioxide gas a in a stable state. In particular, when hot water of about 40 to 80° C. is used, the foaming power of the carbon dioxide gas a can be improved, thereby a washing effect of the inner wall surface of the pipe 2 can be improved. Further, when nitrogen is used, oxidation of the inner wall of the pipe 2 can be prevented by the effect of the nitrogen, in addition to that the water stain and the like deposited on the inner wall of the pipe 2 can be removed by the action of the carbon dioxide gas a. Further, when ionic water is used, the washing force of the carbon dioxide gas a can be improved because the molecules of water flowing in the pipe 2 are made small in size. In the ionic water, silver-ionic water is particularly preferable because a sterilizing and sanitizing effect of the interior of the pipe 2 can be obtained therefrom as well as it is not toxic. Further, when chlorine is used, the clarifying and washing capability for the interior of the pipe 2 can be improved by the oxidizing, bleaching, and sanitizing characteristics of the chlorine, and when ozone water is used, the interior of the pipe 2 can be simultaneously sterilized and sanitized by the foaming power of the carbon dioxide gas a and the characteristics of the ozone water. Further, when antirust is used, occurrence of rust on the inner wall of the pipe 2 can be suppressed, and when oxygen is used, clarification of the interior of the pipe 2 can be accelerated by increasing the foaming power of the carbon dioxide gas a.

Figure 5:
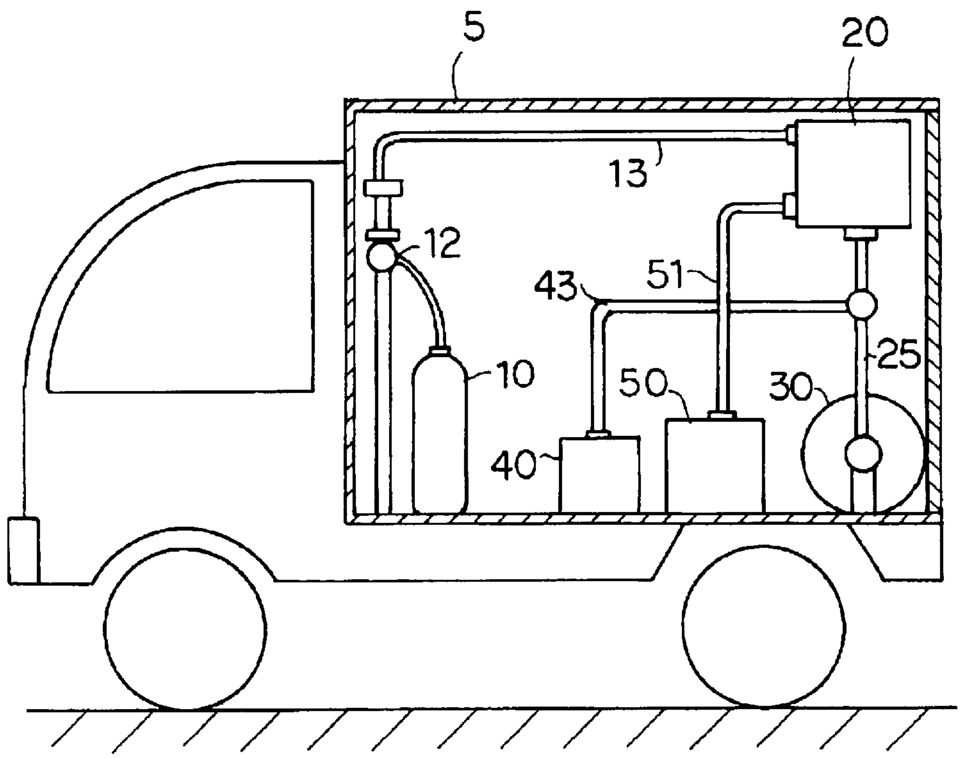
FIG. 5 is a schematic view showing a state in which the pipe washing apparatus of the present invention is loaded on a vehicle.

Further, as shown in FIG. 5, the pipe washing apparatus 1 of the present invention can be loaded on a bed of a vehicle 5 and promptly and easily moved to a washing site of water supply pipes and the like. In this case, a treatment can be flexibly executed according to the layout and the like of the pipes to be washed by winding the connection hose 30 having a long length around the hose reel 31.

Next, a pipe washing method of the present invention will be described.

Figure 3:
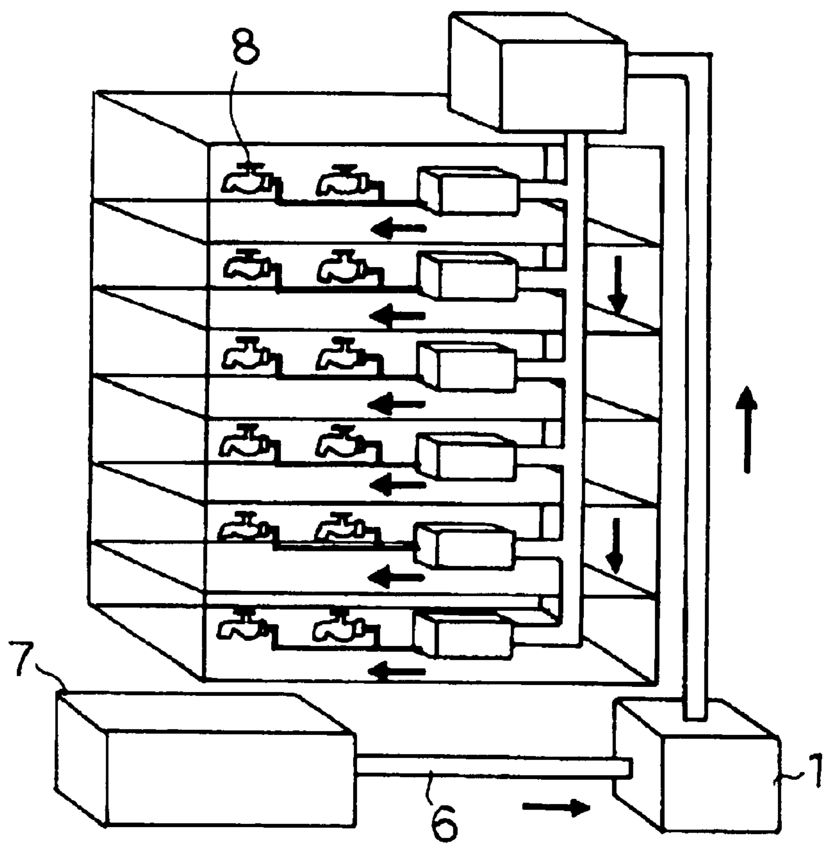
FIG. 3 is a schematic view showing a state in which a pipe in an apartment and a mansion is washed using the pipe washing apparatus of the present invention.
Figure 4:
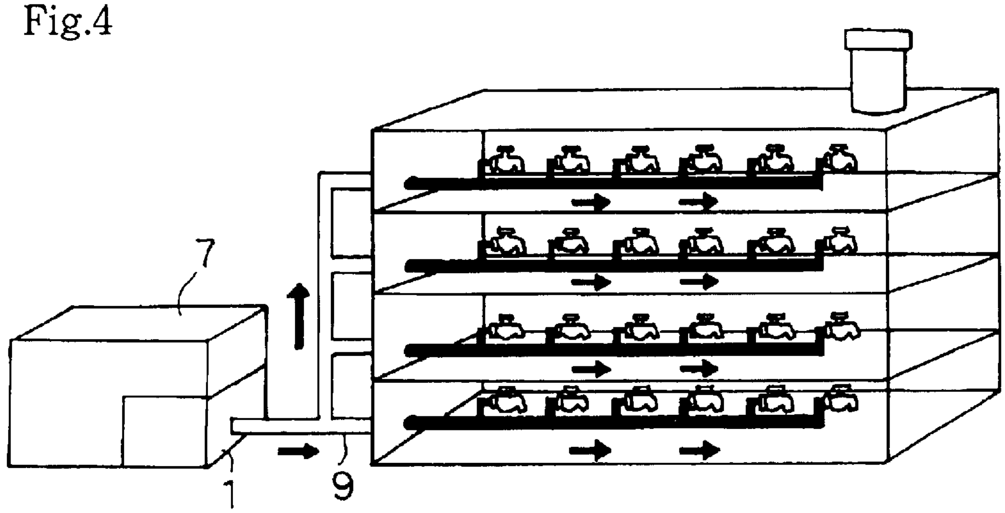
FIG. 4 is a schematic view showing a state in which a pipe in a large building such as a factory and the like is washed using the pipe washing apparatus of the present invention.

FIG. 3 shows a state in which a pipe in an apartment, a mansion and the like is washed. In this case, the washing apparatus 1 is connected to a water supply pipe 6 coupled with a water receiving tank 7, the water stain and the like deposited on the wall surface of the water supply pipe 6 is removed, and then washing water is discharged by opening water outlets 8. Further, FIG. 4 shows a state in which a water supply pipe 9 of a large building such as a factory and the like is washed. In this case, the interior of the water supply pipe 9 is washed by installing the washing apparatus 1 in a water receiving tank 7.

As an ordinary washing method, first, after a stop valve in a meter 3 is closed, the coupler 32 of the connection hose 30 is coupled with the pipe 2 to be washed as shown in FIG. 1. Next, the timer 21, the airflow meter 22, and the air pressure gauge 23 of the dispersing device 20 are adjusted according to the diameter and the length of the pipe 2. Usually, it is preferable that the cleaning device 1 be repeatedly operated for about 20 minutes while spouting the carbon dioxide gas a at an intermitting time of 1 to 3 seconds, preferably 1 to 2 seconds with a pause of 2 to 4 seconds, preferably 2 to 3 seconds. Further, an air pressure is preferably set to 0.4 to 1.0 atm, in particular to 0.8 to 1.0 atm.

Thereafter, the gas pipe 11 is caused to communicate with the gas hose 13 by opening the open/close valve 12, the dispersing device 20 is activated by the switch 24, and the carbon dioxide gas a is spouted into the pipe 2 through the connection hose 30 by manipulating the grip 27 of the open/close valve 26.

Figure 2:
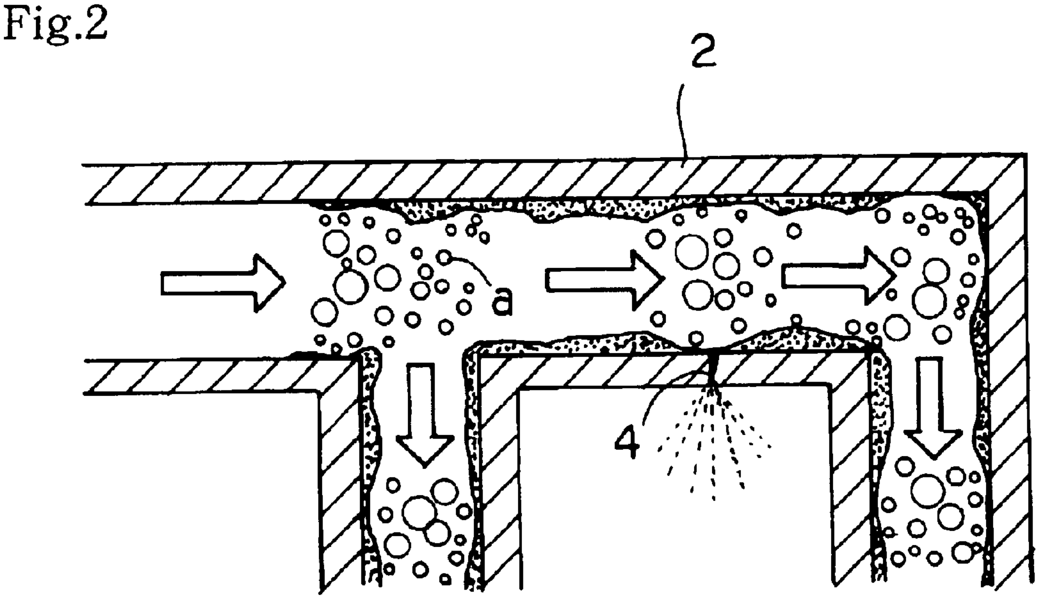
FIG. 2 is a sectional view of a pipe showing a state in which the pipe is washed by a pipe washing method and the pipe washing apparatus of the present invention.

The carbon dioxide gas a spouted into the pipe 2 is dissolved in the water in the pipe and then vaporized by a water flow action in the pipe 2 as shown in FIG. 2, and the water stain, scale, rust, and the like deposited on the inner wall of the pipe 2 are strongly exfoliated and removed in a short time by the foaming action of the carbon dioxide gas a. Further, when a crack 4 and the like arise in a part of the pipe 2 as shown in the figure, the carbon dioxide gas a spouts from the crack 4. Thus, the crack of the pipe 2 can be found by spouting noise of the carbon dioxide gas, thereby water leakage can be investigated simultaneously with the washing of the pipe 2. After the carbon dioxide gas a is spouted, the exfoliated water stain and the like are discharged by flowing water.

When the pressure in the pipe 2 increases beyond the predetermined level by the gas pressure of the carbon dioxide gas a spouted from the dispersing device 20 in the washing, the pressure valve 29 opens so as to discharge carbon dioxide gas a and water in the pipe 2 to the outside from the discharge port 28. This operation can prevent the breakage of the pipe 2 caused by the pressure of the carbon dioxide gas a before it is broken. Note that it is preferable that the pressure of the pressure valve 29 be appropriately set according to the diameter and the length of the water supply pipe.

Further if desired, it is preferable to charge the foaming agent into the coupling pipe 25 by activating the foaming agent charge device 40. In this case, a synergy effect is obtained between the foaming power of the carbon dioxide gas a supplied from the gas cylinders 10 and the foaming action of the powder foaming agent, thereby the water stain, scale, rust, and the like deposited on the inside wall of the pipe 2 can be more effectively removed.

Further, the foaming of the carbon dioxide gas a can be accelerated as well as the washing force for the interior of the pipe 2 can be improved by sterilized and sanitized the interior of the pipe 2 by supplying water, in particular, hot water, nitrogen, ionic water, in particular, silver-ionic water, chlorine, ozone water, antirust, oxygen, etc. to the dispersing device 20 from the supply device 50 according to the diameter and a degree of pollution of the pipe 2.

Next, a well pipe washing method and a well pipe washing apparatus of the present invention will be described.

Figure 8:
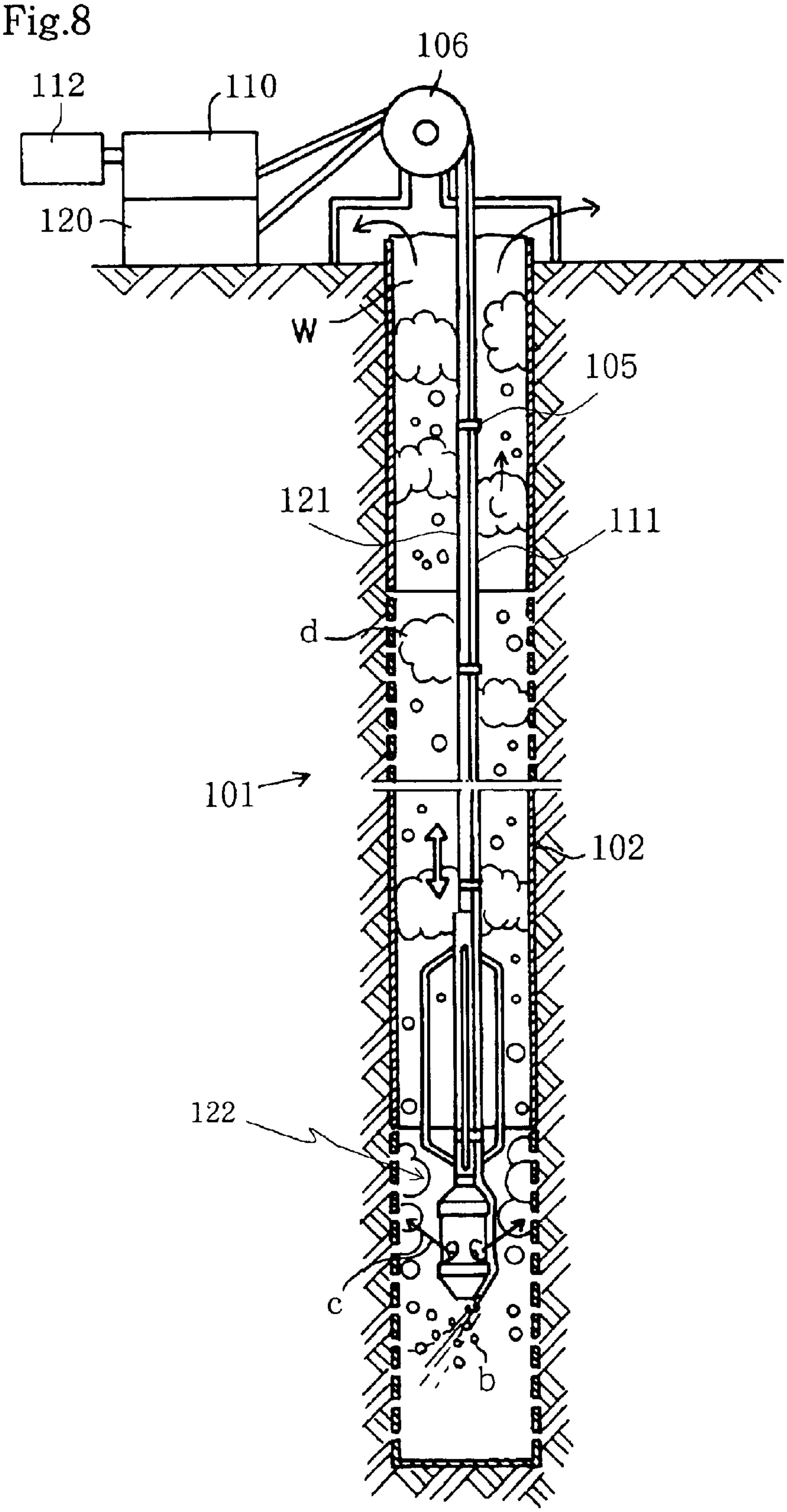
FIG. 8 is an overall schematic view showing a well pipe being washed using the washing apparatus shown in FIG. 6.
Figure 9:
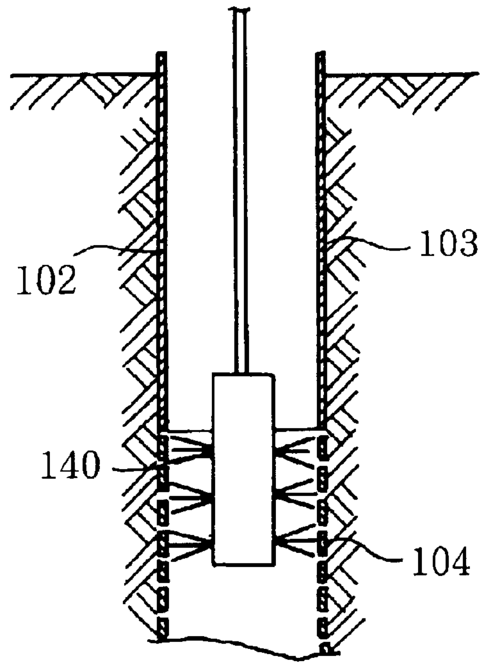
FIG. 9 is a schematic view showing an example of a conventional well pipe washing method.
Figure 10:
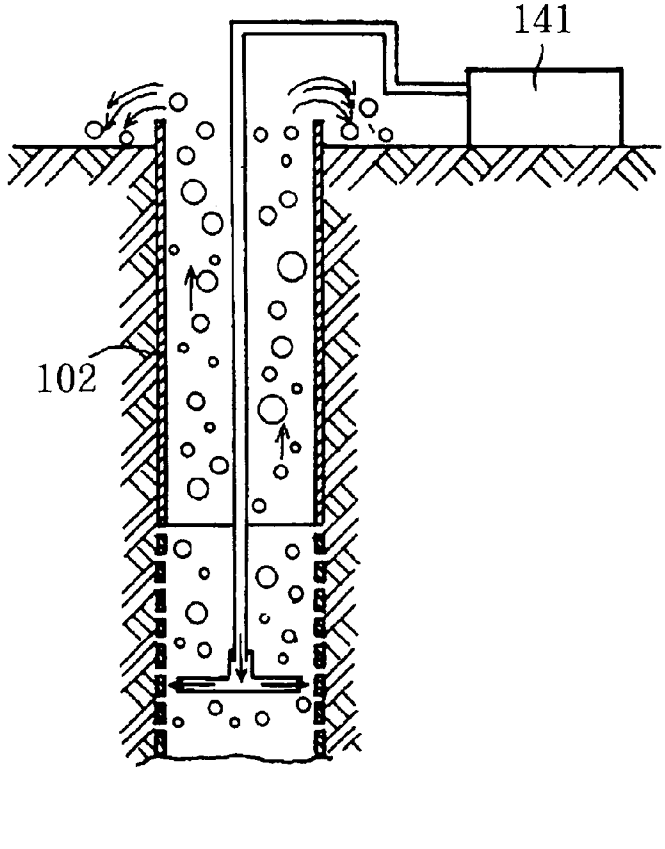
FIG. 10 is a schematic view showing another example of the conventional well pipe washing method.

FIG. 8 shows an overall view of a well pipe washing apparatus 101 according to an embodiment of the present invention. As shown in the figure, the washing apparatus 101 includes a dispersing device 110 for spouting compressed air b into a well pipe 102 through a hose 111 intermittently at appropriate intervals or continuously and a high pressure water washing device for spouting high pressure water c into the well pipe 102.

As shown in the figure, the hose 111 connected to the dispersing device 110 is disposed together with a high pressure hose 121 of the high pressure water washing device, which will be described later, through couplers 105. Further, while not shown, the dispersing device 110 includes a timer for adjusting a spouting time and an intermittent time of the compressed air b, an airflow meter for adjusting an amount of air to be spouted, an air pressure gauge for adjusting an air pressure, and the like.

In contrast, as shown in the figure, the high pressure water washing device includes a high pressure water manufacturing unit 120 for manufacturing the high pressure water c, the high pressure hose 121 for flowing the high pressure water c spouted from the high pressure water manufacturing unit 120 in the well pipe 102, and a washing nozzle 122 attached to an extreme end portion of the high pressure hose 121.

Figure 6:
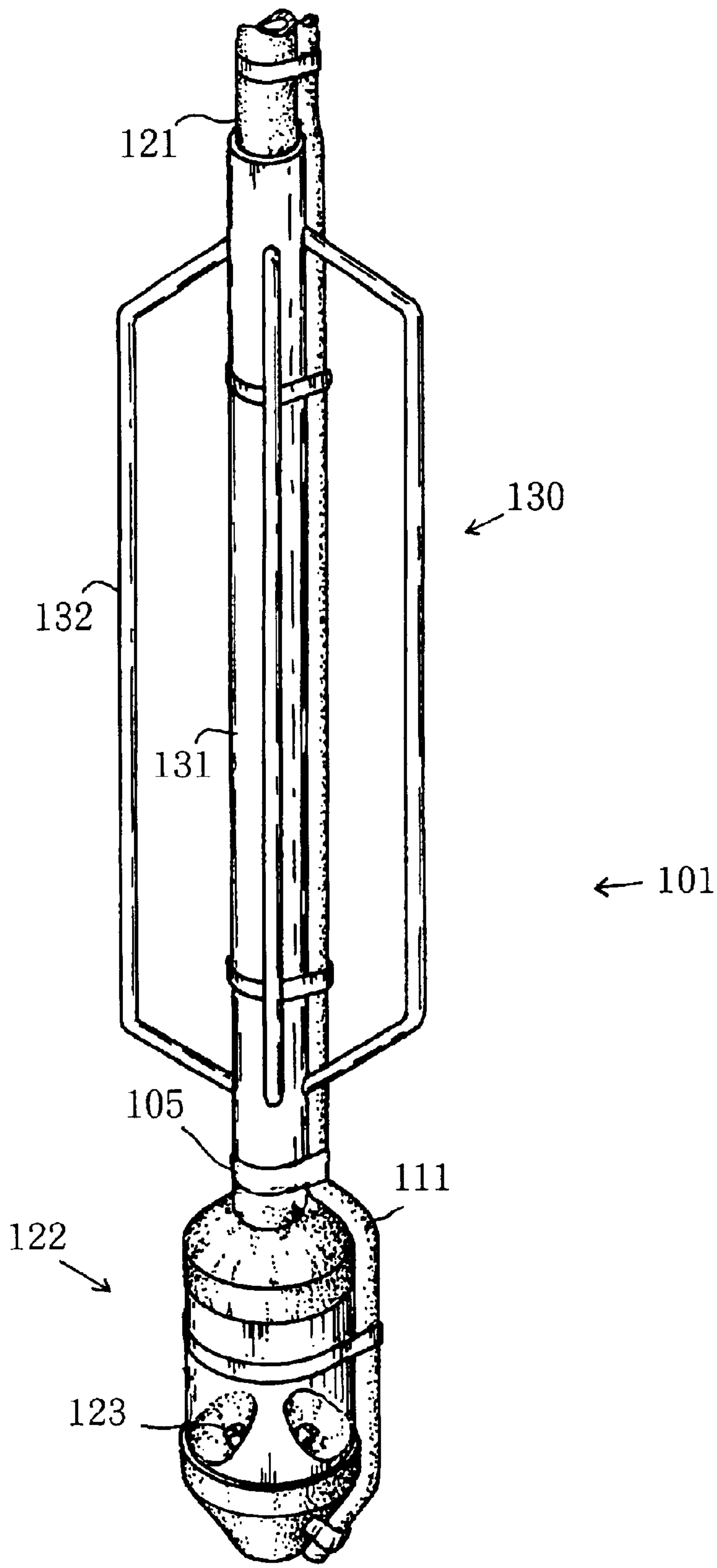
FIG. 6 is a perspective view showing an extreme end portion, which is inserted into a well pipe, of a preferable example of the well pipe washing apparatus of the present invention.

FIG. 6 shows an extreme end portion, which is inserted into the well pipe, of the washing apparatus shown in FIG. 8 in expansion. As shown in the figure, the washing nozzle 122 is formed in a cylindrical shape and includes spouting ports 123 for adjusting a spouting direction of the high pressure water c supplied from the high pressure hose 121. With this arrangement, the high pressure water c can be vigorously spouted to the inner wall surface of the well pipe 102 from an obliquely downward direction, that is, can be spouted obliquely upward from the washing nozzle 122. Further, the washing nozzle 122 may spout the high pressure water c while rotating its main body portion at an appropriate speed, whereby a washing efficiency of the well pipe 102 can be improved.

Further, as shown in FIG. 8, it is preferable in the well pipe washing apparatus of the present invention that a carbon dioxide gas supply unit 112 be connected to the dispersing device 110. A plurality of gas cylinders each filled with, for example, carbon dioxide gas are accommodated in the carbon dioxide gas supply unit 112 and connected to the dispersing device 110 through a gas pipe so that the carbon dioxide gas can be supplied from the dispersing device 110. The carbon dioxide gas supplied from the carbon dioxide gas supply unit 112 is driven into the interior of the well pipe 102 from the extreme end of the hose 111 similarly to the compressed air, and the spouted carbon dioxide gas is dissolved in well water and then vaporized with its foams expanded while rising in the well pipe 102. Accordingly, water stain, scale, rust, and the like deposited on the inner wall of the well pipe 102 can be strongly exfoliated and removed in a short time by the synergy effect of the foaming action of the carbon dioxide gas and the action of the high pressure water c described above.

Further, in the well pipe washing apparatus of the present invention, it is preferable to dispose a nozzle holder 130 above the washing nozzle 122 as shown in FIG. 6 and the like. When high pressure water is spouted in the well pipe 102 from the washing nozzle 122 in washing, the washing nozzle 122 is liable to be oscillated in the well pipe 102 by the pressure of the high pressure water. However, the provision of the nozzle holder 130 permits the position of the washing nozzle 122 to be stably held at an approximate center in the well pipe 102 at all times even if the high pressure water is spouted.

The nozzle holder 130 can be composed of, for example, a shaft member 131 fitted on the high pressure hose 121 and frame members 132 projecting from the outer peripheral surface of the shaft member 131 as shown in the figure. The frame members 132 can be formed of, for example, three arms extending radially at equal intervals from the center of the shaft member 131 around the periphery thereof as shown in, for example, the figure. The washing nozzle 122 can be disposed at the central portion in the well pipe 102 in good condition by making the diameter of a circle formed by the three frame members 132 smaller than the inner diameter of the well pipe 102. Accordingly, it is preferable that the nozzle holder 130 be freely replaced according to the inner diameter of the well pipe 102.

Next, a well pipe washing method of the present invention will be described.

First, a nozzle holder 130 having a diameter according to the inner diameter of the well pipe to be washed is attached to the high pressure hose 121 and the washing nozzle 122 connected to the high pressure water manufacturing unit 120, and the hose 111 connected to the dispersing device 110 is fixed to the nozzle holder 130 integrally therewith using the couplers 105. The extreme end portion of the washing apparatus is lowered into the well pipe 102 through a pulley 106 and the like as shown in FIG. 8. After the washing nozzle 122 reaches the bottom of the well pipe 102, the switches of the dispersing device 110 and the high pressure water manufacturing unit 120 are turned on.

Figure 7:
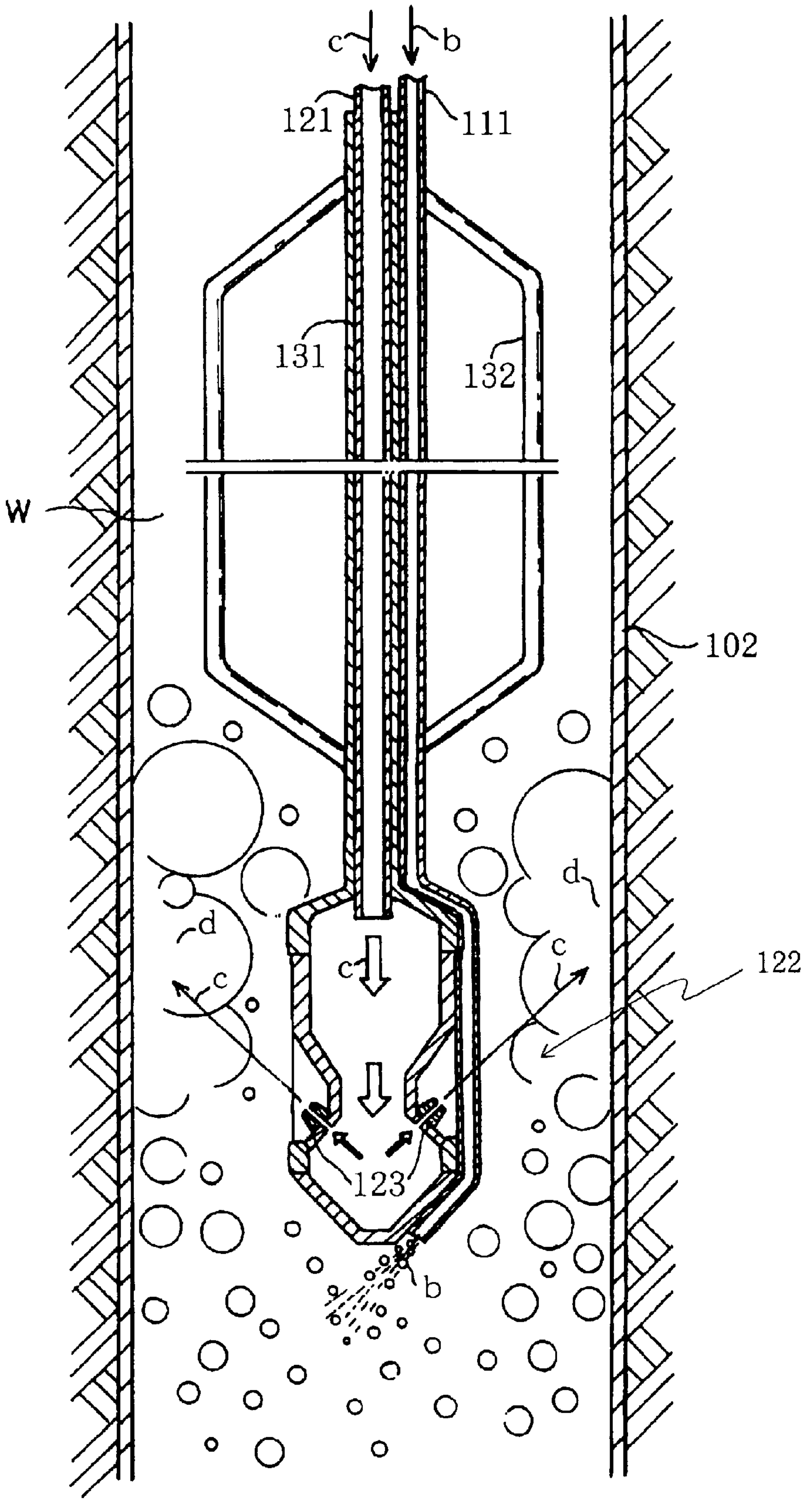
FIG. 7 is a sectional view showing the washing apparatus of FIG. 6 being used.

The dispersing device 110 supplies the compressed air b into the hose 111 intermittently at appropriate intervals (preferably drives the compressed air b for one second and stops it for about two seconds) or continuously, thereby the compressed air b is driven from the extreme end of the hose 111 into the well water w. The driven compressed air b expands foams while rising in the well water w as shown in FIGS. 7 and 8, thereby the water stain, scale, rust and the like deposited on the inner surface of the well pipe 102 can be exfoliated and removed by the action of the expanded foams.

Further, the high pressure water c is supplied in an amount of about 100 to 200 ml/sec from the high pressure water manufacturing unit 120 simultaneous with the discharge of the compressed air b from the hose 111, and vigorously spouted from the spouting ports 123 of the washing nozzle 122 obliquely upward. Accordingly, the compressed air b is expanded and causes the high pressure water c to be directly sprayed onto the wall surface of the well pipe 102 through large foam portions d formed in the well pipe 102, thereby the water stain, scale, rust, and the like deposited in the well pipe 102 can be reliably and effectively removed.

It is preferable in the present invention to execute a washing operation in the well pipe 102 by moving the washing nozzle 122 up and down while discharging the compressed air b and the high pressure water c. Note that the exfoliated water stain and sludge reliably and effectively rise to the surface by the rising action of the compressed air b in the well water w and the force of the high pressure water c discharged obliquely upward and are discharged to the outside of the well pipe 102.

Further, it is preferable to operate the carbon dioxide gas supply unit 112 according to a degree of pollution of the well pipe 102 and to drive the carbon dioxide gas into the pipe from the extreme end of the hose 111. The carbon dioxide gas supplied from the carbon dioxide gas supply unit 112 is driven by the dispersing device 110 intermittently at the appropriate intervals or continuously through the hose 111, and then dissolved in the well water w. Thereafter, the carbon dioxide gas is vaporized while rising in the well pipe 102 and can strongly remove the water stain, scale, rust, and the like deposited on the inner surface of the well pipe 102 by the foaming action thereof.

INDUSTRIAL APPLICABILITY

As described above, according to the pipe washing method and the pipe washing apparatus of the present invention, the inner wall surfaces of pipes can be washed reliably and very sanitarily in a short time without the need of a large-scale facility or operating process as well as the water leakage of the pipes can be investigated.

Further, according to the well pipe washing method and the well pipe washing apparatus of the present invention, the interiors of well pipes can be washed easily and effectively in a short time with a reduced operation time and process by the synergy effect of compressed air, in particular, carbon dioxide gas and high pressure water.

What is claimed is:

1. A pipe washing method, comprising the step of: intermittently or continuously driving carbon dioxide gas into a pipe to wash the interior thereof by the foaming action of the carbon dioxide gas dissolved in the water in the pipe, and charging a powder foaming agent into the pipe in order to obtain a predetermined effect on the foaming action of the carbon dioxide.

2. The pipe washing method according to claim 1, wherein the dissolved carbon dioxide gas is vaporized by flowing water in the pipe, and the interior of the pipe is washed by the action of the vaporized carbon dioxide gas.

3. The pipe washing method according to claim 1, wherein the step of charging the powder foaming agent into the pipe is performed intermittently.

4. A pipe washing apparatus, comprising gas cylinders filled with carbon dioxide gas, a dispersing device for intermittently or continuously spouting the carbon dioxide gas supplied from the gas cylinders, a connection hose for causing the dispersing device to communicate with a pipe to be washed, and a foaming agent charger for charging powder foaming agent connected between the dispersing device and the connection hose.

5. The pipe washing apparatus according to claim 4, wherein a pressure valve for discharging gas and water in the pipe when the pressure in the pipe reaches at least a predetermined level is interposed between the dispersing device and the connection hose.

6. The pipe washing apparatus according to claim 4, wherein the dispersing device is connected to the connection hose through a coupling pipe, the foaming agent charger being connected to the coupling pipe.

7. The pipe washing apparatus according to claim 4, wherein a supply device for charging an additive is connected to the dispersing device, the additive and the carbon dioxide gas being independently supplied to the dispersing device.

8. The pipe washing apparatus according to claim 7, wherein the additive is any one kind selected from a group including water, nitrogen, ionic water, chlorine, ozone water, antirust, and oxygen.

9. The pipe washing apparatus according to claim 8, wherein the additive is silver-ionic water.

10. The pipe washing apparatus according to claim 4, wherein the washing apparatus is loaded on a vehicle.

11. The pipe washing apparatus according to claim 4, further comprising a valve between the foaming agent charger and the coupling pipe, the valve for intermittently supplying the powder foaming agent into the coupling pipe.

* * * * *